United States Patent Office 3,361,623
Patented Jan. 2, 1968

3,361,623
NOVEL ALCOHOL AND DERIVATIVES THEREOF
Everett E. Gilbert, Morris Township, Morris County, and Pasquale Lombardo, East Hanover Township, Morris County, N.J., assignors to Allied Chemical Corporation, New York, N.Y., a corporation of New York
No Drawing. Filed Jan. 30, 1963, Ser. No. 255,065
17 Claims. (Cl. 167—30)

This invention relates to a novel alcohol prepared from the ketone, decachlorooctahydro-1,3,4-metheno-2H-cyclobuta (cd) pentalen-2-one, to derivatives of said alcohol and to use of said alcohol and its derivatives for pesticidal purposes.

The novel alcohol of this invention, hereafter referred to as "the alcohol," is a complex chlorinated polycyclic alcohol having the molecular formula $C_{10}Cl_{10}HOH$. It is believed to be most accurately represented by the following "cage" structural formula:

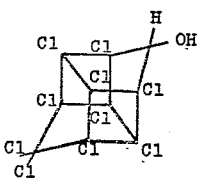

An object of the present invention is to provide a new alcohol and derivatives thereof exhibiting high pesticidal activity.

Another object of the present invention is to provide new pesticidal compositions containing the alcohol or a derivative thereof as active ingredient.

A still further object of the invention is to provide a method of combatting pests comprising contacting the pests with new pesticidal compositions containing the alcohol or a derivative thereof as active ingredient.

Other objects and advantages of the invention will be apparent from the following description.

The new alcohol of this invention may be obtained by reduction of the ketone, decachlorooctahydro-1,3,4-metheno-2H-cyclobuta (cd) pentalen-2-one. Decachlorooctahydro-1,3,4-metheno-2H-cyclobuta (cd) pentalen-2-one may be prepared in known manner by hydrolyzing the reaction product of hexachlorocyclopentadiene and sulfur trioxide.

The alcohol is prepared by refluxing decachlorooctahydro-1,3,4-metheno-2H-cyclobuta (cd) pentalen-2-one with a metallic hydride under substantially anhydrous conditions at temperature of about 50° to 175° C., preferably about 85° to 100° C. The reaction which occurs may be represented by the following equation:

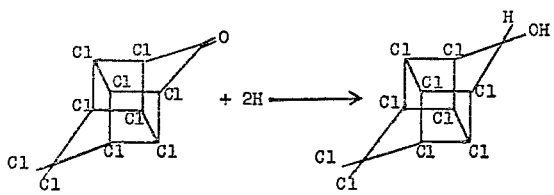

Derivatives of the alcohol include inorganic esters, organic esters and carbamates. Among the organic esters of the alcohol, the monocarboxylates are of particular interest. The alcohol derivatives may be readily prepared by procedures known in the art.

Hereinafter the structure

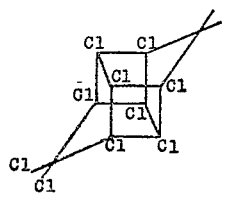

will be represented by R<. Thus, the alcohol of this invention may be designated as

$$R\diagup^{H}_{\diagdown OH}$$

Any of the conventional metallic hydrides may be used in preparing the alcohol of this invention. These hydrides are preferably metallic tetrahydrides such as $NaBH_4$ and $LiAlH_4$. Since each mol of tetrahydride produces 4 atoms of hydrogen, at least about 0.5 mol of tetrahydride per mol of decachlorooctahydro-1,3,4-metheno-2H-cyclobuta (cd) pentalen-2-one is employed. Particularly outstanding results have been attained using a substantial excess of the tetrahydride, for example, about 1 to 2 mols of tetrahydride per mol of decachlorooctahydro-1,3,4-metheno-2H-cyclobuta (cd) pentalen-2-one.

The reduction of the ketone to alcohol must be carried out in the presence of an organic solvent which is inert to the reactants and desired alcohol product. Among the suitable solvents are aromatic hydrocarbons, such as xylene, toluene, etc., and high boiling ethers, such as dibutyl ether, tetrahydrofuran, etc.

The desired alcohol may be recovered from the reaction mixture by any suitable procedure, such as by precipitation with a non-solvent, e.g. hexane, followed by filtration and drying.

The following examples are typical of preparation of the alcohol and derivatives thereof. In the examples, parts are by weight except where otherwise indicated.

EXAMPLE 1

Preparation of the alcohol 150 parts of crude hydrate of decachlorooctahydro-1,3,4-metheno-2H-cyclobuta (cd) pentalen-2-one (4 mols water) were refluxed with 1290 parts of xylene to effect dehydration of the hydrate by azeotropic distillation. A solution of 130 parts of anhydrous decachlorooctahydro-1,3,4-metheno-2H-cyclobuta (cd) pentalen-2-one in xylene resulted. This solution was added with stirring over a two-hour period to a suspension of 8 parts of lithium aluminum hydride in 423 parts of ethyl ether. The mixture was then refluxed for three hours at 90° C. The reaction mixture was cooled and to it were successively added 8 parts of water, 9.4 parts of a 15% aqueous sodium hydroxide solution and 24 parts of water. Insoluble material was filtered off, and the solvent was evaporated to give 90 parts of the crude alcohol. This represented a yield of about 69% of theory.

Crude alcohol, produced as described above, was purified by first heating it for 3 hours at 95° C. with a 5% aqueous sodium hydroxide solution. This dissolved any unreacted starting material, while the alcohol remained insoluble and was filtered off. The alcohol was then further purified by recrystallization from hexane.

That the alcohol is a true derivative of decachloro-octahydro-1,3,4-metheno-2H-cyclobuta (cd) pentalen-2-one was shown by an experiment in which the alcohol was reconverted to starting material by oxidation with chromic acid. Further, the alcohol failed to form hydrates, as does decachlorooctahydro-1,3,4-metheno-2H-cyclobuta (cd) pentalen-2-one.

The purified product was a white solid decomposing at about 360° C. It possessed an infrared absorption curve with a single peak at 2.85 microns which is characteristic of the hydroxyl group.

EXAMPLE 2

Preparation of chloroacetate derivative 30 parts of the alcohol were dissolved in 289 parts of toluene. 8 parts of chloroacetyl chloride were added to the solution, and the mixture was refluxed for 24 hours. The solvent was then removed with the aid of an air stream to yield a crude solid comprising the chloroacetate derivative of the alcohol. The solid was dissolved in an acetone-hexane mixture, decolorized by heating with charcoal, filtered and crystallized by cooling. 24 parts of the following product, corresponding to a yield of 69% of theory, were obtained:

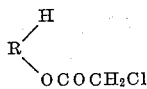

The product had a melting point of 146–147° C., and its infrared spectrum showed carbonyl absorption at 5.60 microns, ester bands at 8.56–8.82 microns and carbon-hydrogen stretching.

EXAMPLE 3

Preparation of potassium sulfate derivative via chlorosulfonic acid 40 parts of the alcohol were dissolved in 406 parts of tetrachloroethylene. 9.5 parts of chlorosulfonic acid dissolved in 162 parts of tetrachloroethylene were added to the solution at room temperature with stirring. The solution blackened, and a slight evolution of heat occurred. The mixture comprising an acid sulfate of the alcohol was stirred at room temperature for about 30 minutes and neutralized with dilute aqueous potassium hydroxide solution. The resulting slurry was filtered. 42 parts of a solid comprising the following potassium sulfate derivative of the alcohol were obtained:

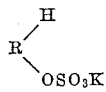

The reactions which occurred during this run are set forth below:

(1) 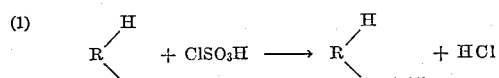

(2) 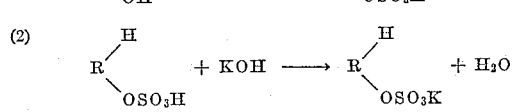

The product had no melting point but decomposed at an elevated temperature. A quaternary titration showed the product had a molecular weight of 616, as compared to a theoretical molecular weight of 611 for the potassium sulfate derivative. The infrared spectrum of the product showed sulfate absorption near 8.00 microns and no carbonyl absorption.

EXAMPLE 4

Preparation of potassium sulfate derivative via sulfur trioxide

The process of Example 3 was repeated using sulfur trioxide in place of chlorosulfonic acid. An identical product was obtained, as indicated by comparing the infrared spectra.

10 grams of the potassium sulfate derivative were purified by dissolving it in 100 ml. of hot isopropanol, treating the solution with decolorizing charcoal, filtering, evaporating to 50 ml. and allowing the residue to crystallize.

EXAMPLE 5

Preparation of barium sulfate derivative

The acid sulfate prepared as described in Example 3 was neutralized with dilute aqueous barium hydroxide solution to give the following analogous barium sulfate derivative:

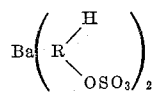

16 grams of the material were purified by dissolving it in 1 liter of hot 50% isopropanol, treating the solution with decolorizing charcoal, filtering, evaporating to 350 ml. and allowing the residue to crystallize.

EXAMPLE 6

Preparation of strontium sulfate derivative

The acid sulfate prepared as described in Example 3 was converted to the following strontium sulfate derivative by neutralization with dilute aqueous strontium hydroxide solution:

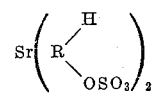

The material was purified by the procedure described in Example 5.

EXAMPLE 7

Preparation of N-methyl carbamate derivative 25 parts of the alcohol, 3 parts of methyl isocyanate, 39.6 parts of acetone and 3 drops of triethylamine were mixed in a pressure bottle, allowed to stand for one hour, then heated for 4½ hours at 90°–100° C. After the reaction mixture had cooled, the solvent was evaporated. 28 parts, corresponding to 100% yield, of the following N-methyl carbamate derivative of the alcohol was obtained:

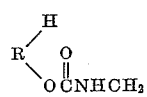

This material melted at 175–185° C. and possessed an infrared spectrum showing carbonyl absorption at 5.71 microns and nitrogen-hydrogen stretching near 3.00 microns.

EXAMPLE 8

Preparation of chloride derivative 30 parts of the alcohol and 40 parts of phosphorus pentachloride were heated together with stirring at 145–150° C., for 3 hours. After cooling, the reaction mixture was poured into 99 parts of methanol, thereby decomposing excess phosphorus pentachloride. Precipitated solid was filtered off and washed with methanol to yield 14 parts of the following chloride derivative of the alcohol:

The reaction which occurred during this run is believed to be as follows:

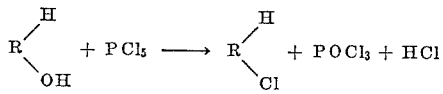

This material was a white solid melting at about 380° C. in a sealed tube. The infrared spectrum of the material showed the absence of hydroxyl and other functional groups. Upon analysis, 75.5% chlorine was found, as compared to a theoretical chlorine content of 76.3% calculated for

EXAMPLE 9

*Preparation of laurate derivative*

30 parts of the alcohol and 13.5 parts of lauroyl chloride were dissolved in 172 parts of xylene, and the solution was heated at reflux for 17 hours. The xylene was stripped in vacuo, and a dark oil was obtained. The oil was then dissolved in ethyl ether and extracted with aqueous sodium bicarbonate to remove unreacted lauroyl chloride. The ether was then evaporated to produce 36.5 parts of a viscous oil, corresponding to a yield of 89.7% theory, of the following laurate derivative of the alcohol:

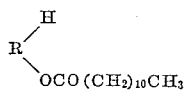

The infrared spectrum of the product showed carbonyl absorption at 5.64, 5.84 microns, ester bands at 8.79 microns and carbon-hydrogen stretching.

EXAMPLE 10

*Preparation of oleate derivative*

The process described in Example 9 was followed using 30 parts of the alcohol and 18.5 parts of oleoyl chloride. 40 parts of a viscous oil, corresponding to a yield of 85% of theory, of the following oleate derivative of the alcohol were obtained:

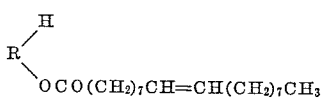

The infrared spectrum of the product exhibited carbonyl absorption at 5.64, 5.83 microns, ester bands at 8.78 microns and carbon-hydrogen stretching.

EXAMPLE 11

*Preparation of N-phenyl carbamate derivative*

25 parts of the alcohol, 7 parts of phenyl isocyanate, 86.6 parts of toluene and 4 parts of pyridine were mixed and refluxed with stirring for 22 hours. The solution was stripped of solvent in vacuo to yield a glassy solid. The solid was dissolved in 22 parts of toluene. 132 parts of hexane were added, and the solution was allowed to stand overnight. Crystallization occurred, and 7.5 parts of colorless crystals (M.P. 145–147° C.) of the following N-phenyl carbamate derivative of the alcohol were obtained:

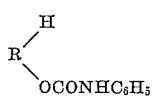

An additional 10.5 parts of product were recovered by condensation of the filtrate to give a total yield of 57% of theory.

The infrared spectrum of the product showed carbonyl absorption at 5.76 microns, nitrogen-hydrogen stretching at 2.97 microns and aromatic ring vibrations at 6–7 microns.

EXAMPLE 12

*Preparation of carboethoxymethyl carbamate derivative*

30 parts of the alcohol and 8 parts of ethyl isocyanato acetate were dissolved in 86.6 parts of toluene. 5 parts of pyridine were added, and the solution was stirred at reflux for 11 hours. The solvent was removed by stripping in vacuo to yield a viscous oil. The oil was dissolved in dichloromethane, treated with decolorizing charcoal and filtered. Hexane was added to the filtrate, and some of the dichloromethane was removed by distillation. Upon cooling, a solid was obtained which formed 28 parts (74% of theory) of the following carboethoxymethyl carbamate derivative of the alcohol.

A portion of the product was recrystallized from hexane to yield a white solid having a melting point of 141–145° C. The infrared spectrum of the purified product showed carbonyl absorption at 5.70, 5.81 microns and nitrogen-hydrogen stretching at 3.00 microns.

EXAMPLE 13

*Preparation of chlorodifluoroacetate derivative*

30 parts of the alcohol were dissolved in about 20 parts of chlorodifluoroacetyl chloride in 173 parts of toluene. The mixture was refluxed with stirring at 95–100° C. for 20 hours. The mixture was cooled and stripped of solvent in vacuo. The resulting solid was dissolved in hexane and frozen out in Dry Ice-acetone. 22 parts (57% of theory) of the following chlorodifluoroacetate derivative of the alcohol were obtained in two crops:

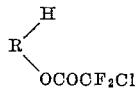

A portion of the product was recrystallized from hexane to yield a white solid having a melting point of 112–118° C. The infrared spectrum of the purified product showed carbonyl absorption at 5.57 microns and ester bands near 8.46 microns.

EXAMPLE 14

*Preparation of bromide derivative*

30 parts of the alcohol, 54 parts of phosphorus tri bromide and 32 parts of bromine were mixed in a Carius tube. The tube was sealed and heated at 140–160° C. for 9 hours. The tube was then cooled and opened, and the reaction mass washed out with water, filtered and air-dried. 34 parts of wet product comprising the following bromide derivative of the alcohol were obtained:

The product was recrystallized 3 times from methyl alcohol-dichloromethane mixture to yield a white solid having a melting point of about 380° C. with decomposition. The infrared spectrum of the product showed the absence of hydroxyl and other functional groups.

EXAMPLE 15

*Preparation of ethyl carbamate derivative*

20 parts of the alcohol and 5 parts of ethyl isocyanate were dissolved in 176 parts of benzene. To the solution were added 3 drops of triethylamine, and the solution was refluxed for 17 hours at about 80° C. The solution was then stripped of solvent in vacuo to yield a tan solid. The solid was washed with hexane, and 21 parts (91% of theory) of air-dried product comprising the following ethyl carbamate derivative of the alcohol were obtained:

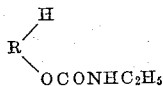

A small portion of the product was recrystallized from hexane to obtain a purified product melting at 174–176° C. The infrared spectrum of the product showed carbonyl absorption at 5.74, 5.83 microns and nitrogen-hydrogen stretching at 3.00 microns.

EXAMPLE 16

*Preparation of n-propyl carbamate derivative*

20 parts of the alcohol and 6 parts of n-propyl isocyanate were mixed with 176 parts of benzene. 3 drops of triethylamine were added to the mixture, and the mixture was then refluxed for about 18 hours. The resulting solution was stripped of solvent in vacuo to yield a tan solid. The solid was triturated with hexane and filtered. The filtered material was washed with hexane to yield 22 parts (96% of theory) of product comprising the following n-propyl carbamate derivative of the alcohol:

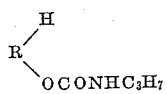

Most of the product was recrystallized from hexane-methylene chloride mixture to obtain a purified product having a melting point of 126–129° C. The infrared spectrum of the product showed carbonyl absorption at 5.72, 5.83 microns and nitrogen-hydrogen stretching at 3.01 microns.

EXAMPLE 17

*Preparation of n-butyl carbamate*

15 parts of the alcohol and 4 parts of n-butyl isocyanate were dissolved in 176 parts of benzene. 3 drops of triethylamine were added to the solution, and the solution was refluxed for 17 hours. Solvent was stripped from the solution in vacuo, thereby obtaining a solid which was triturated with hexane and filtered. The solid was identified as unreacted alcohol. The filtrate and solid were combined, and to the mixture were added 176 parts of benzene, 10 parts of butyl isocyanate and several drops of triethylamine. This mixture was refluxed at about 80° C. for 22 hours. Solvent and excess isocyanate were stripped in vacuo to yield a viscous oil comprising the following n-butyl carbamate derivative of the alcohol:

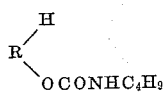

The product was dissolved in dichloromethane, and hexane was added to the solution. A small amount of insoluble material was filtered off, and the filtrate was boiled down until crystallization occurred. The resulting slurry was cooled and solid product was filtered off and washed with hexane. 10 grams of product having a melting point of 147–149° C. were obtained. The infrared spectrum of the product showed carbonyl absorption at 5.72 microns and nitrogen-hydrogen stretching at 3.00 microns.

EXAMPLE 18

*Preparation of carbobutoxymethyl carbamate derivative*

15 parts of the alcohol and 4.8 parts of butyl isocyanato acetate were mixed with 220 parts of benzene and several drops of triethylamine. The mixture was heated at reflux for 19 hours. Solvent was then stripped in vacuo to yield a viscous oil. The oil was triturated with hot low boiling petroleum ether to produce a solid comprising the following carbobutoxymethyl carbamate derivative of the alcohol:

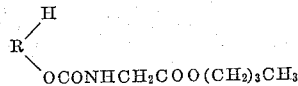

The solid was filtered off and washed with petroleum ether to produce 17 parts of product having a melting point of 109–112° C. The infrared spectrum of the product showed carbonyl absorption at 5.65, 5.77 microns and nitrogen-hydrogen stretching at 2.96 microns.

EXAMPLE 19

*Preparation of alcohol-dimethyl α-isocyanato glutarate reaction product*

15 parts of the alcohol and 5.2 parts of dimethyl α-isocyanato glutarate were mixed with 220 parts of benzene containing several drops of triethylamine. The mixture was heated at reflux for several hours. The mixture was then stripped of solvent in vacuo to yield a viscous oil which was triturated with low boiling petroleum ether containing a small quantity of methylene chloride, thereby forming a tan solid. The solid was filtered off and washed with petroleum ether to give 13 parts of the following reaction product of the alcohol and dimethyl α-isocyanato glutarate:

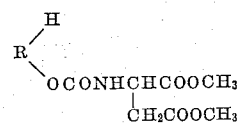

The product had a melting point of 122–132° C. The infrared spectrum of the product showed carbonyl absorption of 5.70, 5.78 microns and nitrogen-hydrogen stretching at 2.89 microns.

The alcohol and derivatives thereof of this invention may be applied as pesticides "as is" but are advantageously incorporated as active ingredients in suitable liquid or solid carriers to provide pesticidal spray or dust compositions.

The liquid pesticidal compositions generally contain in proportions by weight about 10 to 25% of the alcohol or derivative as active ingredient, about 65 to 88% of an aromatic solvent and about 2 to 10% of a suitable wetting or emulsifying agent, such as diglycol oleate, p-isooctyl phenyl ether of polyethylene glycol, blends of alkyl aryl polyether alcohols with alkyl aryl sulfonates and blends of polyoxyethylene sorbitan esters of mixed fatty and resin acids with alkyl aryl sulfonates. The resulting concentrate solution is diluted or admixed with water to form an aqueous dispersion or emulsion suitable for spray application containing about 0.001 to 0.1% by weight of active ingredient.

Representative aromatic solvents which may be used in preparing the liquid pesticidal compositions include xylene, high aromatic solvents, methylated naphthalenes, heavy aromatic naphtha, etc.

The wettable powder compositions generally contain in proportions by weight about 25 to 75% of the active ingredient, about 20 to 73% of a finely divided solid carrier and about 2 to 5% of suitable wetting and dispersing agents. Typical wetting agents include polyether sulfonates, alkyl aryl sulfonates, etc. Typical dispersing agents include ligninsulfonates, naphthalene sulfonic acid-formaldehyde condensates, etc.

The wettable powder compositions can readily be prepared by mixing or milling the active ingredient with the carrier and wetting agent to a typical particle size of from about 3 to 40 microns. The composition is admixed with water to form an aqueous dispersion suitable for spraying containing about 0.001 to 0.1% by weight of active ingredient.

Representative solid carriers which may be used in preparing the wettable powders include magnesium and aluminum silicates (talc, kaolin clays, attapulgite clays, etc.), carbonates (dolomite, chalk, etc.), materials containing silicic acid (diatomaceous earth), fuller's earth, gypsum, sulfur, etc.

The dosage of the active ingredient depends on the particular organisms to be controlled, field conditions, etc., as known in the art. In any event, sufficient quantity of the active ingredient is used to provide the desired toxicity.

Exemplary pesticidal tests of the alcohol and derivatives thereof of the present invention are set forth below.

A 1% solution of the alcohol diluted with sufficient water to attain a concentration of 10 p.p.m. was tested against spores of *Sclerotinia fructicola* (brown rot of stone fruits), produced by growing the fungus on potato dextrose agar plants for one week. Following an incubation period of 24 hours at 65° F., the solution was examined under a microscope to determine average percent germination of spores. The alcohol was found to give 0% spore germination, as compared to 92% germination for copper ion in a similar test.

Since various changes and modifications may be made in this invention without departing from the spirit thereof, the invention is deemed to be limited only by the scope of the appended claims.

| Active Ingredient | Formulation | Percent Kill | | |
|---|---|---|---|---|
| | | Mexican Bean Beetle Larvae | Southern Armyworms | Pea Aphids |
| The Alcohol | 1 part acetone solutions [1] per 19 parts water | 90 | 100 | |
| Chloroacetate Derivative | 1 part acetone solution [1] per 9 parts acetone +10 parts water | 90 | 100 | |
| Chloride Derivative | 1 part acetone solution [1] per 19 parts water | 100 | 100 | 50 |
| Potassium Sulfate Derivative | 8 pounds 25% wettable powder composition [2] per 100 gallons water | 100 | 100 | |
| N-Methyl Carbamate Derivative | 2 pounds active ingredient as acetone solution [1] per 100 gallons water | 100 | 100 | 100 |
| N-Phenyl Carbamate Derivative | 8 pounds 25% wettable powder composition [2] per 100 gallons water | | 100 | |
| Laurate Derivative | 2 pounds active ingredient as acetone solution [1] per 100 gallons water | | 80 | |
| Oleate Derivative | 2 pounds active ingredient as acetone solution [1] per 100 gallons water | | 80 | 100 |
| Bromide Derivative | 2 pounds active ingredient as acetone solution [1] per 100 gallons water | 100 | 100 | 100 |
| Carboethoxymethyl Carbamate Derivative | 8 pounds 25% wettable powder composition [2] per 100 gallons water | 100 | 100 | 100 |
| Chlorodifluoroacetate Derivative | 8 pounds 25% wettable powder composition [2] per 100 gallons water | 100 | 100 | |
| Ethyl Carbamate Derivative | 2 pounds active ingredient per 100 gallons acetone-water solution (1:1) | 100 | 100 | 100 |
| n-Propyl Carbamate Derivative | 2 pounds active ingredient per 100 gallons acetone-water solution (1:1) | 100 | 100 | 100 |
| Carbobutoxymethyl Carbamate Derivative | 2 pounds active ingredient per 100 gallons acetone-water solution (1:1) | 80 | 100 | 100 |
| Alcohol-Dimethyl α-Isocyanato Glutarate Reaction Product | 2 pounds active ingredient per 100 gallons acetone-water solution (1:1) | | 100 | |

[1] 4.8 grams active ingredient dissolved in acetone to 100 cc.
[2] 25.0% active ingredient, 73.5% "Attaclay" (attapulgite clay carrier), 0.75% "Elvanol" 51-05 (water-soluble synthetic polyvinyl alcohol dispersing agent), 0.75% "Nacconol SW" (alkyl aryl sulfonate wetting agent).

The tests on toxicity to Mexican bean beetle larvae (*Epilachna varivestis*) were carried out by spraying horticultural (cranberry) bean plants with the indicated formulation of the active ingredient and allowing the plants to dry. The larvae were confined to the treated foliage by means of wire cages. Record of kill was made 3 days after treatment.

The tests on Southern armyworms (*Prodenia eridania*) were carried out by spraying horticultural (cranberry) bean plants with the indicated formulation of the active ingredient and allowing the plants to dry. The armyworms were confined to the treated foliage by means of wire cages. Mortality count was made three days after treatment.

The tests on toxicity to pea aphids (*Macrosiphum pisi*) were carried out by removing the pea aphids from infested plants, placing them on a wire screen and spraying them with the indicated formulation of the active ingredient. Following treatment, the pea aphids were confined to untreated broad bean plants. Record of kill was made three days after treatment.

We claim:
1. A compound selected from the group consisting of (1) the alcohol having the following formula:

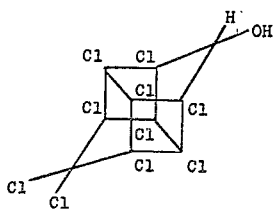

(2) sulfate mono-esters of said alcohol, (3) halides of said alcohol having the following formula:

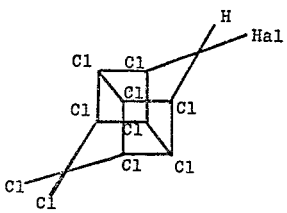

wherein Hal is halogen, (4) monocarboxylates of said alcohol having the following formula:

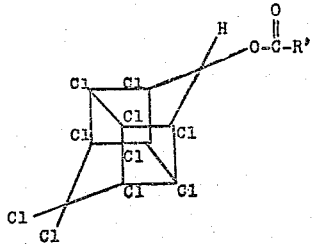

wherein R' is alkyl, haloalkyl or alkenyl, and (5) carbamates of said alcohol having the following formula:

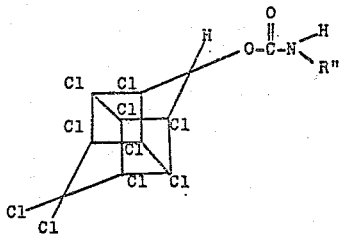

wherein R" is alkyl, aryl or carboalkoxyalkyl.

2. The alcohol having the following formula:

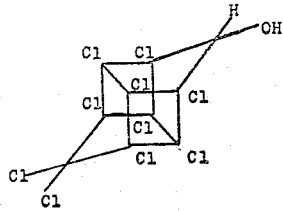

3. The monocarboxylates of the alcohol of claim 1.
4. The sulfate mono-esters of the halides of claim 1.
5. The carbamates of claim 1.
6. An insecticidal composition comprising at least 10% by weight of a compound of claim 1 as active ingredient, together with a liquid or solid diluent therefor.
7. An insecticidal composition comprising at least 10% by weight of the alcohol of claim 2 as active ingredient, together with a liquid or solid diluent therefor.
8. An insecticidal composition comprising at least 10% by weight of a monocarboxylate of claim 3 as active ingredient, together with a liquid or solid diluent therefor.
9. An insecticidal composition comprising at least 10% by weight of a sulfate mono-ester or halide of claim 4 as active ingredient, together with a liquid or solid diluent therefor.
10. An insecticidal composition comprising at least 10% by weight of a carbamate of claim 5 as active ingredient, together with a liquid or solid diluent therefor.
11. A process for combatting insects which comprises contacting the insects with a toxic quantity of a composition comprising a compound of claim 1 as active ingredient.
12. A process for combatting insects which comprises contacting the insects with a toxic quantity of a composition comprising the alcohol of claim 2 as active ingredient.
13. A process for combatting insects which comprises contacting the insects with a toxic quantity of a composition comprising a monocarboxylate of claim 3 as active ingredient.
14. A process for combatting insects which comprises contacting the insects with a toxic quantity of a composition comprising a sulfate mono-ester or halide of claim 4 as active ingredient.
15. A process for combatting insects which comprises contacting the insects with a toxic quantity of a composition comprising a carbamate of claim 5 as active ingredient.
16. A process for preparing the alcohol of claim 2 which comprises refluxing decachlorooctahydro - 1,3,4-methano-2H- cyclobuta (cd) pentalen-2-one with a metallic hydride in the presence of an inert organic solvent under substantially anhydrous conditions at temperature of about 85° to 100° C.
17. The process of claim 16 in which the metallic hydride is a metallic tetrahydride.

References Cited

UNITED STATES PATENTS

| | | | |
|---|---|---|---|
| Re. 24,435 | 2/1958 | Gilbert et al. | 260—617 |
| 2,662,922 | 12/1953 | Kleiman et al. | 260—617 |
| 2,671,043 | 3/1954 | Gilbert et al. | 260—648 |
| 2,702,305 | 2/1955 | Gilbert et al. | 260—648 |
| 2,714,617 | 8/1955 | Lidov et al. | 260—648 |
| 2,841,485 | 7/1958 | Johnson et al. | 71—2.3 |
| 2,864,680 | 12/1958 | Degginger | 71—2.3 |
| 2,972,563 | 2/1961 | Richter | 167—30 |
| 2,992,967 | 7/1961 | Haubein | 167—30 |
| 2,997,490 | 8/1961 | Huber | 260—410 |
| 2,997,491 | 8/1961 | Huber et al. | 260—410 |
| 3,014,052 | 12/1961 | Guex et al. | 260—410.9 |
| 3,023,228 | 2/1962 | Wagner et al. | 260—471 |
| 3,037,906 | 6/1962 | Gilbert et al. | 260—648 X |
| 3,055,948 | 9/1962 | Hoch et al. | 260—611 |
| 3,086,987 | 4/1963 | Pomot et al. | 260—482 |
| 3,096,239 | 7/1963 | Hoch et al. | 167—30 |
| 3,202,692 | 8/1965 | Weil et al. | 260—461 |
| 3,212,973 | 10/1965 | Roberts et al. | 260—648 X |
| 3,240,808 | 3/1966 | Gilbert et al. | 260—563 |
| 3,281,453 | 10/1966 | Weil et al. | 260—468 |

OTHER REFERENCES

Earle: "The Aluminum Halide Catalyzed Dimerization of Perhalogenated Cyclopentadienes," Ph.D. Thesis, Purdue University, 1957, p. 54.

McBee et al.; Jour. American Chemical Soc., vol. 78 (1956), pp. 1511 to 1512.

Morrison et al.: Organic Chemistry, p. 623 (1959).

LEON ZITVER, Primary Examiner.

JULIAN S. LEVITT, CHARLES B. PARKER, G. A. MENTIS, A. H. SUTTO, T. G. DILLAHUNTY,
Examiners.

UNITED STATES PATENT OFFICE
CERTIFICATE OF CORRECTION

Patent No. 3,361,623

January 2, 1968

Everett E. Gilbert et al.

It is hereby certified that error appears in the above numbered patent requiring correction and that the said Letters Patent should read as corrected below.

Column 4, lines 53 to 57, the formula should appear as shown below instead of as in the patent:

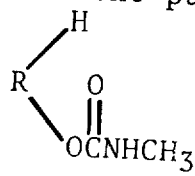

column 11, line 37, strike out "the alcohol of"; line 38, for "of", first occurrence, read -- or --.

Signed and sealed this 18th day of February 1969.

(SEAL)

Attest:

Edward M. Fletcher, Jr.
Attesting Officer

EDWARD J. BRENNER
Commissioner of Patents